(12) United States Patent
Horiuchi et al.

(10) Patent No.: US 9,720,106 B2
(45) Date of Patent: Aug. 1, 2017

(54) RADIATION DETECTOR AND SCINTILLATOR PANEL, AND METHODS FOR MANUFACTURING SAME

(71) Applicant: Toshiba Electron Tubes & Devices Co., Ltd., Otawara-shi (JP)

(72) Inventors: Hiroshi Horiuchi, Otawara (JP); Hiroshi Aida, Otawara (JP); Atsuya Yoshida, Utsunomiya (JP)

(73) Assignee: Toshiba Electron Tubes & Devices Co., Ltd., Otawara-shi (JP)

( * ) Notice: Subject to any disclaimer, the term of this patent is extended or adjusted under 35 U.S.C. 154(b) by 34 days.

(21) Appl. No.: 15/153,095

(22) Filed: May 12, 2016

(65) Prior Publication Data
US 2016/0377742 A1 Dec. 29, 2016

Related U.S. Application Data

(63) Continuation of application No. PCT/JP2014/071502, filed on Aug. 15, 2014.

(30) Foreign Application Priority Data

Nov. 15, 2013 (JP) .................... 2013-236666
Nov. 15, 2013 (JP) .................... 2013-236667

(51) Int. Cl.
*C30B 25/02* (2006.01)
*C23C 14/34* (2006.01)
(Continued)

(52) U.S. Cl.
CPC .......... *G01T 1/2023* (2013.01); *G01T 1/2018* (2013.01)

(58) Field of Classification Search
CPC ...... G01T 1/2023; G01T 1/2018; C23C 14/34
See application file for complete search history.

(56) References Cited

U.S. PATENT DOCUMENTS

2008/0083877 A1* 4/2008 Nomura ............... G01T 1/2018
250/370.11
2012/0001282 A1 1/2012 Goto et al.

FOREIGN PATENT DOCUMENTS

JP 11-315278 11/1999
JP 2003-262673 9/2003
(Continued)

OTHER PUBLICATIONS

International Search Report issued Sep. 16, 2014 in PCT/JP2014/071502 filed on Aug. 15, 2014 (with English translation).
(Continued)

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

According to an embodiment, a radiation detector comprises a photoelectric conversion substrate and a scintillator layer. The photoelectric conversion substrate converts light into an electrical signal. The scintillator layer contacts the photoelectric conversion substrate and converts radiation incident from the outside into light. The scintillator layer is a fluorescer of CsI containing Tl as an activator. The CsI is a halide. The concentration of the activator inside the fluorescer is 1.6 mass %±0.4 mass %. The concentration of the activator inside the fluorescer in an in-plane direction of the scintillator layer has the relationship of central portion>peripheral portion. The central portion is a central region of a formation region of the scintillator layer. The peripheral portion is an outer circumferential region of the formation region of the scintillator layer.

11 Claims, 12 Drawing Sheets

(51) Int. Cl.
*G01T 1/202* (2006.01)
*G01T 1/20* (2006.01)

(56) References Cited

FOREIGN PATENT DOCUMENTS

| | | |
|---|---|---|
| JP | 2007-232636 | 9/2007 |
| JP | 2010-127628 | 6/2010 |
| WO | WO 2010/103917 A1 | 9/2010 |

OTHER PUBLICATIONS

Written Opinion issued Sep. 16, 2014 in PCT/JP2014/071502 filed on Aug. 15, 2014.

\* cited by examiner

| | TI CONCENTRATION IN SCINTILLATOR LAYER(mass%) | |
|---|---|---|
| | CENTRAL PORTION | PERIPHERAL PORTION |
| A | 0.1 | 0.1 |
| B | 1.0 | 1.0 |
| C | 1.2 | 1.2 |
| D | 1.6 | 1.6 |
| E | 1.7 | 1.5 |

FIG. 17A
FIG. 17B
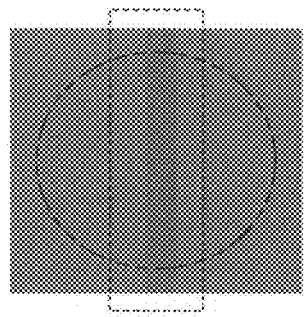
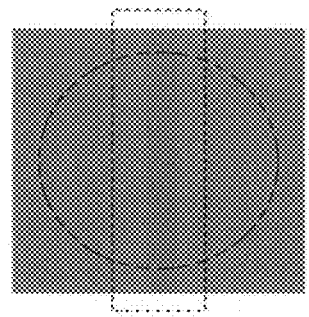
FIG. 17C
FIG. 17D
FIG. 17E
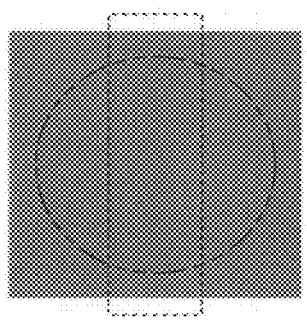
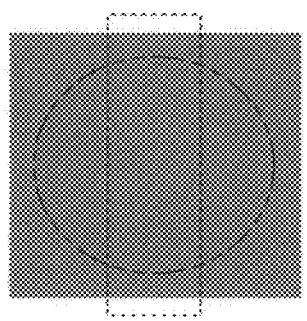
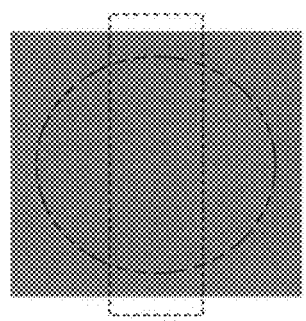
| | SCINTILLATOR LAYER REGION | SCINTILLATOR LAYER Tl CONCENTRATION(mass%) | SENSITIVITY RATIO | MTF RATIO (at2Lp/mm) | AFTERIMAGE RATIO |
|---|---|---|---|---|---|
| A | CENTRAL PORTION | 0.1 | 1.00 | 1.00 | 1.00 |
| | PERIPHERAL PORTION | | | | |
| B | CENTRAL PORTION | 1.0 | 1.23 | 1.00 | 0.50 |
| | PERIPHERAL PORTION | | | | |
| C | CENTRAL PORTION | 1.2 | 1.25 | 1.00 | 0.30 |
| | PERIPHERAL PORTION | | | | |
| D | CENTRAL PORTION | 1.6 | 1.30 | 1.00 | 0.14 |
| | PERIPHERAL PORTION | | | | |
| E | CENTRAL PORTION | 1.7 | 1.30 | 1.00 | 0.13 |
| | PERIPHERAL PORTION | 1.5 | 1.30 | 1.00 | 0.14 |
FIG. 18

RADIATION DETECTOR AND SCINTILLATOR PANEL, AND METHODS FOR MANUFACTURING SAME

CROSS-REFERENCE TO RELATED APPLICATIONS

This application is based upon and claims the benefit of priority from the prior Japanese Patent Application No.2013-236666, filed on Nov. 15, 2013, the prior Japanese Patent Application No.2013-236667, filed on Nov. 15, 2013, and the prior PCT Patent Application PCT/JP2014/071502, filed on Aug. 15, 2014; the entire contents of which are incorporated herein by reference.

FIELD

Embodiments of the invention relates to a radiation detector and a scintillator panel, and methods for manufacturing the same.

BACKGROUND

An X-ray detector that is a planar radiation detector using an active matrix or a solid-state imaging element such as CCD, CMOS, etc., is drawing attention as a new-generation X-ray diagnostic image detector. By irradiating X-rays onto the X-ray detector, an X-ray image or a real time X-ray image is output as a digital signal.

The X-ray detector includes a photoelectric conversion substrate that converts light into an electrical signal, and a scintillator layer that contacts the photoelectric conversion substrate and converts the X-rays incident from the outside into light. Then, the light of the incident X-rays converted by the scintillator layer reaches the photoelectric conversion substrate and is converted into charge; and the charge is read as an output signal and converted into a digital image signal by a prescribed signal processing circuit, etc.

In the case where the scintillator layer includes CsI which is a halide, simple CsI cannot convert the incident X-rays into visible light; therefore, similarly to a general fluorescer, an activator is included to activate the excitation of the light due to the incident X-rays.

In the X-ray detector, because the peak wavelength of the light reception sensitivity of the photoelectric conversion substrate exists at the vicinity of 400 nm to 700 nm in the visible light region, in the case where CsI is used in the scintillator layer, Tl is used as the activator because the wavelength of the light excited by the incident X-rays in Tl is at the vicinity of 550 nm.

In the case where the scintillator layer is a fluorescer of CsI containing Tl as an activator and the CsI is a halide, similarly to a fluorescer containing a general activator, the characteristics of the scintillator layer are greatly affected by the concentration and concentration distribution of Tl which is the activator.

In an X-ray detector or a scintillator panel including the scintillator layer containing the activator, in the case where the concentration and concentration distribution of the activator are not corrected, this causes characteristic degradation of the scintillator layer, affects the afterimage (the phenomenon in which the subject image of the X-ray image of the (n−1)th time or earlier remains in the X-ray image of the nth time), and affects the sensitivity (the luminous efficiency) relating to the light emission characteristics of the scintillator layer.

For example, because the imaging conditions are greatly different between the subjects in the diagnosis using the X-ray image (the ray amount of the incident X-rays being about 0.0087 mGy to 0.87 mGy (because the X-ray transmittance is different between sections)), a large difference may occur in the ray amount of the incident X-rays between the X-ray image of the (n−1)th time and the X-ray image of the nth time. Here, in the case where the ray amount difference of the incident X-rays of the X-ray images of the (n−1)th time and the nth time is (n−1)>n, the afterimage occurs because the light emission characteristics of the scintillator layer of the non-subject portion of the X-ray image of the (n−1)th time change due to the large energy of the incident X-rays; and the effects remain through the X-ray image of the nth time.

For the diagnosis using the X-ray image, the afterimage characteristics are important characteristics even when compared to other characteristics of the scintillator layer such as the sensitivity (the luminous efficiency) and the resolution (the MTF).

In the diagnosis using the X-ray image, normally, there are many cases where the diagnosis is performed in the state in which the subject is disposed at the central portion of the X-ray image; therefore, the characteristics in the central region of the formation region of the scintillator layer are important.

Conventionally, there have been proposals to regulate the concentration and concentration distribution of the activator of the scintillator layer to improve the sensitivity (the luminous efficiency) and the resolution (the MTF).

BRIEF DESCRIPTION OF THE DRAWINGS

FIG. 17A, FIG. 17B, FIG. 17C, FIG. 17D, and FIG. 17E are X-ray images respectively obtained by the samples A, B, C, D, and E of the radiation detector according to the embodiment;

FIG. 18 is a graph showing characteristics obtained by the samples A, B, C, D, and E of the radiation detector according to the embodiment;

DETAILED DESCRIPTION

According to an embodiment, a radiation detector comprises a photoelectric conversion substrate and a scintillator layer. The photoelectric conversion substrate converts light into an electrical signal. The scintillator layer contacts the photoelectric conversion substrate and converts radiation incident from the outside into light. The scintillator layer is a fluorescer of CsI containing Tl as an activator. The CsI is a halide. The concentration of the activator inside the fluorescer is 1.6 mass %±0.4 mass %. The concentration of the activator inside the fluorescer in an in-plane direction of the scintillator layer has the relationship of central portion >peripheral portion. The central portion is a central region of a formation region of the scintillator layer. The peripheral portion is an outer circumferential region of the formation region of the scintillator layer.

Embodiments according to the invention will now be described with reference to FIG. 1 to FIG. 24.

Figure 1:
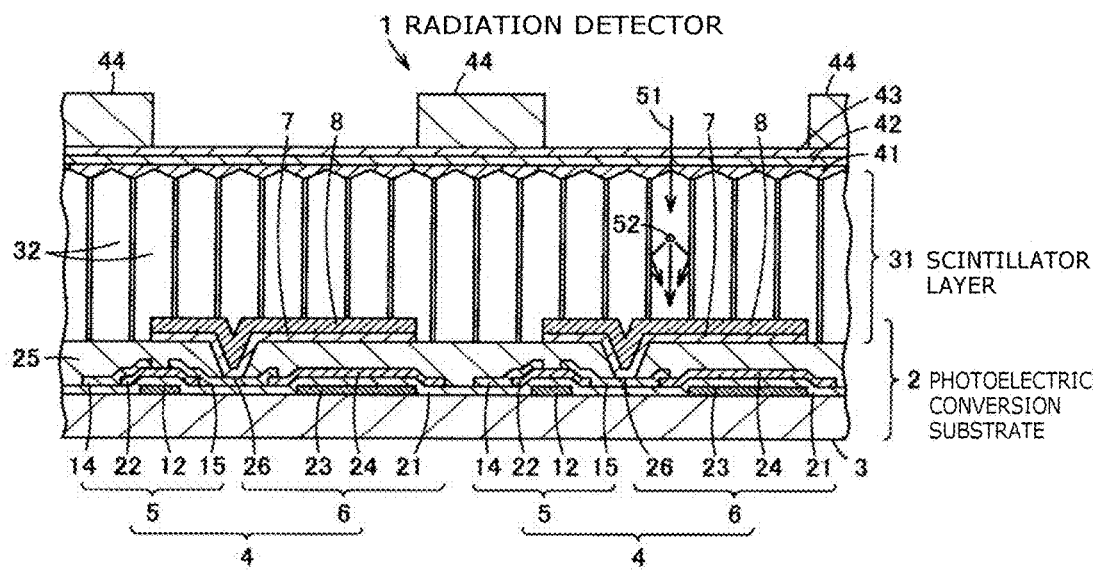
FIG. 1 is a cross-sectional view showing a first structure example of a radiation detector according to an embodiment.
Figure 3:
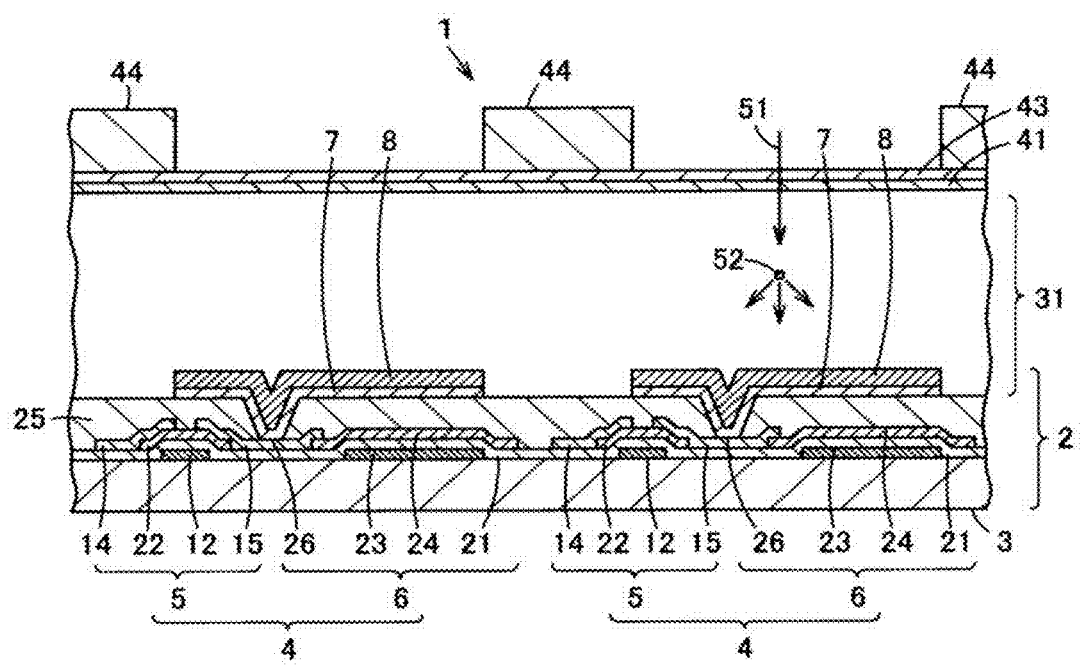
FIG. 3 is a cross-sectional view showing a third structure example of the radiation detector according to the embodiment.
Figure 4:
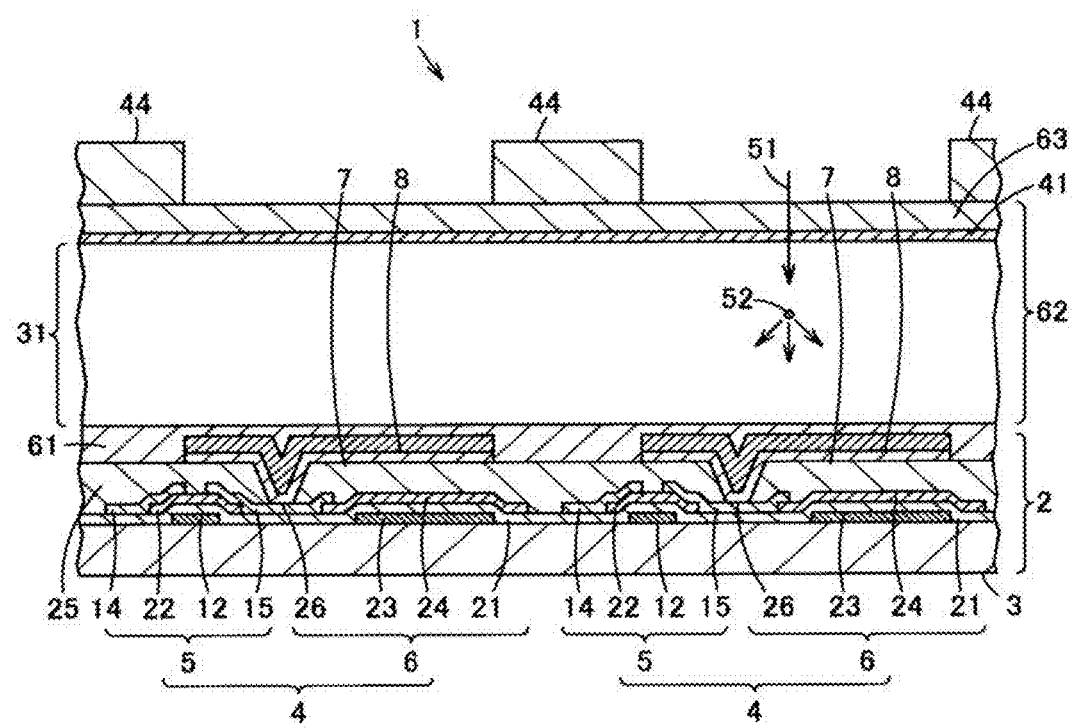
FIG. 4 is a cross-sectional view showing a fourth structure example of the radiation detector according to the embodiment.
Figure 5:
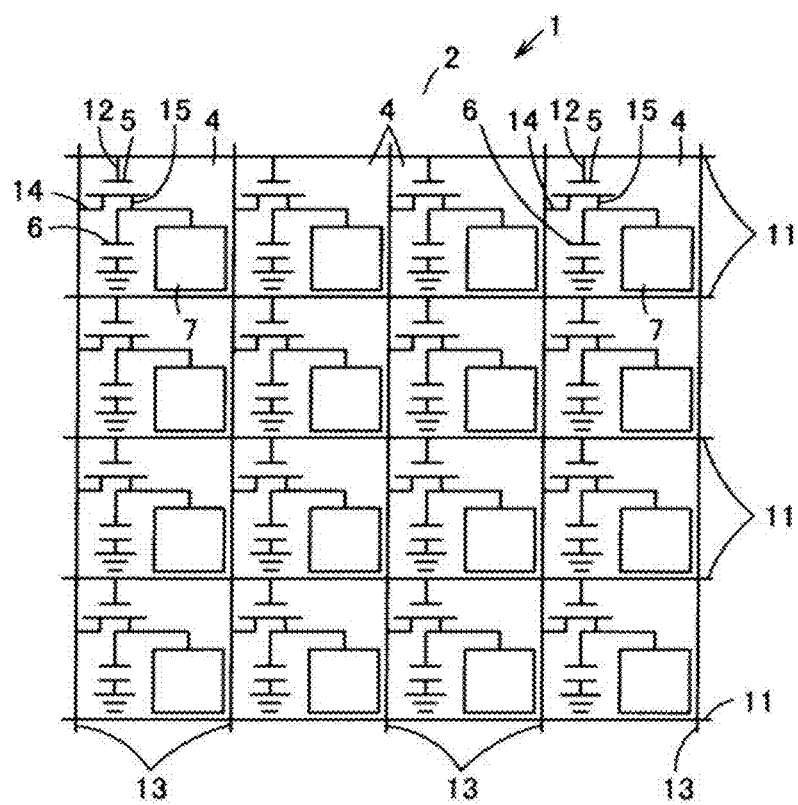
FIG. 5 is an equivalent circuit of the radiation detector according to the embodiment.
Figure 6:
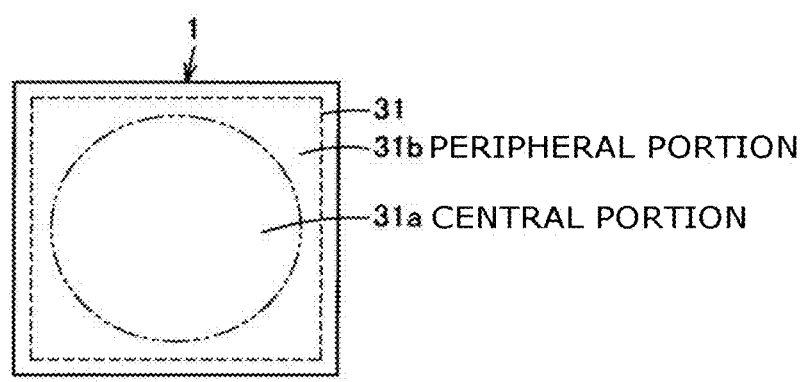
FIG. 6 is a front view of the radiation detector according to the embodiment.

The basic configuration of a radiation detector 1 is described with reference to FIG. 1 to FIG. 4; and FIG. 1 to FIG. show first to fourth structure examples. FIG. 5 is an equivalent circuit diagram of the basic configuration. First, the first structure example of the X-ray detector 1 will be described as the radiation detector with reference to FIG. 1 and FIG. 5. As shown in FIG. 1, the X-ray detector 1 is an indirect X-ray planar image detector. The X-ray detector 1 includes a photoelectric conversion substrate 2 which is an active matrix photoelectric conversion substrate that converts visible light into an electrical signal.

The photoelectric conversion substrate 2 includes a support substrate 3 as an insulating substrate formed in transparent glass or the like having a rectangular flat plate configuration. Multiple pixels 4 are arranged two-dimensionally in a matrix configuration in the surface of the support substrate 3 with spacing between the pixels 4; and a thin film transistor (TFT) 5 as a switching element, a charge storage capacitor 6, a pixel electrode 7, and a photoelectric conversion element 8 such as a photodiode or the like are formed in each of the pixels 4. As shown in FIG. 5, control electrodes 11 as multiple control lines along a row direction of the support substrate 3 are provided on the support substrate 3. The multiple control electrodes 11 are positioned between the pixels 4 on the support substrate 3 and are provided to be separated from each other in a column direction of the support substrate 3. The gate electrodes 12 of the thin film transistors 5 are electrically connected to the control electrodes 11.

Multiple read-out electrodes 13 along the column direction of the support substrate 3 are provided on the support substrate 3. The multiple read-out electrodes 13 are positioned between the pixels 4 on the support substrate 3 and are provided to be separated from each other in the row direction of the support substrate 3. The source electrodes 14 of the thin film transistors 5 are electrically connected to the multiple read-out electrodes 13. A drain electrode 15 of the thin film transistor 5 is electrically connected to both the charge storage capacitor 6 and the pixel electrode 7.

As shown in FIG. 1, the gate electrodes 12 of the thin film transistors 5 are formed in island configurations on the support substrate 3. An insulating film 21 is formed to be stacked on the support substrate 3 including the gate electrodes 12. The insulating film 21 covers each of the gate electrodes 12. The multiple semi-insulating films 22 that have island configurations are formed to be stacked on the insulating film 21. The semi-insulating film 22 includes a semiconductor and functions as a channel region of the thin film transistor 5. The semi-insulating films 22 are disposed to respectively oppose the gate electrodes 12 and respectively cover the gate electrodes 12. In other words, the semi-insulating films 22 are provided, with the insulating film 21 interposed, respectively on the gate electrodes 12.

The source electrode 14 and the drain electrode 15 that have island configurations are formed on the insulating film 21 including the semi-insulating film 22. The source electrode 14 and the drain electrode 15 are insulated from each other and are not electrically connected to each other. The source electrode 14 and the drain electrode 15 are provided on two sides on the gate electrode 12; and one end portion of the source electrode 14 and one end portion of the drain electrode 15 are stacked on the semi-insulating film 22. As shown in FIG. 5, the gate electrode 12 of each thin film transistor 5 and the gate electrodes 12 of the other thin film transistors 5 positioned in the same row are electrically connected to a common control electrode 11. The source electrode 14 of each thin film transistor 5 and the source electrodes 14 of the other thin film transistors 5 positioned in the same column are electrically connected to a common read-out electrode 13.

As shown in FIG. 1, the charge storage capacitor 6 includes a lower electrode 23 having an island configuration formed on the support substrate 3. The insulating film 21 is formed to be stacked on the support substrate 3 including the lower electrodes 23. The insulating film 21 that is on the gate electrode 12 of each thin film transistor 5 extends onto each lower electrode 23. Upper electrodes 24 having island configurations are formed to be stacked on the insulating film 21. The upper electrodes 24 are disposed to oppose the lower electrodes 23 and cover each of the lower electrodes 23. In other words, the upper electrodes 24 are provided, with the insulating film 21 interposed, respectively on the lower electrodes 23. The drain electrodes 15 are formed to be stacked on the insulating film 21 including the upper electrodes 24. One other end portion of the drain electrode 15 is stacked on the upper electrode 24 and electrically connected to the upper electrode 24.

An insulating layer 25 is formed to be stacked on the insulating film 21 including the semi-insulating film 22, the source electrode 14, and the drain electrode 15 of each of the thin film transistors 5 and the upper electrode 24 of each of the charge storage capacitors 6. The insulating layer 25 is formed of silicon oxide ($SiO_2$), etc., and is formed to surround each of the pixel electrodes 7.

A through-hole 26 is made in a portion of the insulating layer 25 as a contact hole communicating with the drain electrode 15 of the thin film transistor 5. The pixel electrode 7 having the island configuration is formed to be stacked on the insulating layer 25 including the through-hole 26. The pixel electrode 7 is electrically connected to the drain electrode 15 of the thin film transistor 5 via the through-hole 26.

The photoelectric conversion element 8 such as a photodiode or the like that converts visible light into an electrical signal is formed to be stacked on each of the pixel electrodes 7.

A scintillator layer 31 that converts X-rays as the radiation into visible light is formed in the surface of the photoelectric conversion substrate 2 where the photoelectric conversion element 8 is formed. By vapor deposition such as vacuum vapor deposition, sputtering, CVD, etc., the scintillator layer 31 is formed by depositing, in columnar configurations on the photoelectric conversion substrate 2, a fluorescer such as a halogen compound such as cesium iodide (CsI) or the like, an oxide compound such as gadolinium oxide sulfur (GOS) or the like, etc., which are high-luminance fluorescent substances. The scintillator layer 31 is formed to have a columnar crystal structure in which columnar crystals 32 having multiple rectangular configurations are formed in the planar direction of the photoelectric conversion substrate 2.

A reflective layer 41 for increasing the utilization efficiency of the visible light converted by the scintillator layer 31 is formed to be stacked on the scintillator layer 31. A protective layer 42 that protects the scintillator layer 31 from the moisture inside ambient air is formed to be stacked on the reflective layer 41. An insulating layer 43 is formed to be stacked on the protective layer 42. An X-ray grid 44 that has a lattice configuration and shields between the pixels 4 is formed on the insulating layer 43.

Then, in the X-ray detector 1 thus configured, X-rays 51 that are incident on the scintillator layer 31 as the radiation are converted into visible light 52 by the columnar crystals 32 of the scintillator layer 31.

The visible light 52 reaches the photoelectric conversion element 8 of the photoelectric conversion substrate 2 via the columnar crystals 32 and is converted into an electrical signal.

The electrical signal that is converted by the photoelectric conversion element 8 flows in the pixel electrode 7; and until the gate electrode 12 of the thin film transistor 5 connected to the pixel electrode 7 is switched to a driving state, the electrical signal moves into the charge storage capacitor 6 connected to the pixel electrode 7 and is maintained and stored by the charge storage capacitor 6.

At this time, when one of the control electrodes 11 is switched to the driving state, the one row of thin film transistors 5 that is connected to the control electrode 11 switched to the driving state is switched to the driving state.

The electrical signals that are stored in the charge storage capacitors 6 connected to the thin film transistors 5 switched to the driving state are output to the read-out electrodes 13.

As a result, because the signals corresponding to the pixels 4 of a designated row of the X-ray image are output, the signals corresponding to all of the pixels 4 of the X-ray image can be output by the drive control of the control electrodes 11; and the output signals are converted into digital image signals and output.

Figure 2:
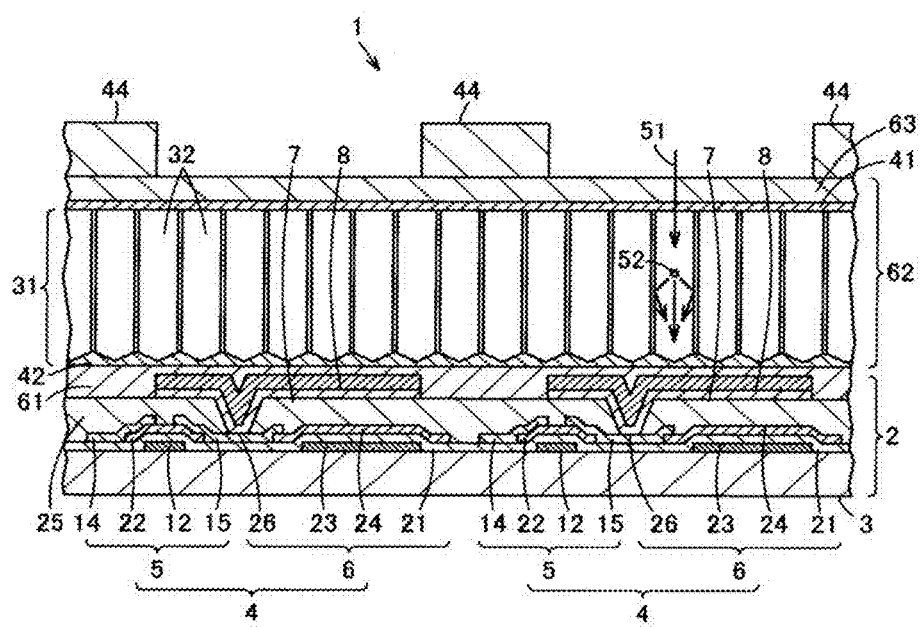
FIG. 2 is a cross-sectional view showing a second structure example of the radiation detector according to the embodiment.

The second structure example of the X-ray detector 1 will now be described with reference to FIG. 2. The same reference numerals as the first structure example of the X-ray detector 1 are used; and a description of similar configurations and effects is omitted.

The structure and effects of the photoelectric conversion substrate 2 are the same as those of the first structure example.

A scintillator panel 62 is bonded onto the photoelectric conversion substrate 2 with a bonding layer 61 interposed.

The scintillator panel 62 includes a support substrate 63 that transmits the X-rays 51. The reflective layer 41 that reflects light is formed on the support substrate 63; the scintillator layer 31 that includes the multiple columnar crystals 32 having rectangular configurations is formed on the reflective layer 41;

and the protective layer 42 that seals the scintillator layer 31 is formed to be stacked on the scintillator layer 31. Further, the X-ray grid 44 that has a lattice configuration and shields between the pixels 4 is formed on the support substrate 63. Then, in the X-ray detector 1 thus configured, the X-rays 51 that are incident on the scintillator layer 31 of the scintillator panel 62 are converted into the visible light 52 by the columnar crystals 32 of the scintillator layer 31.

The visible light 52 reaches the photoelectric conversion elements 8 of the photoelectric conversion substrate 2 via the columnar crystals 32, is converted into electrical signals, and is converted into digital image signals and output as described above.

The third structure example of the X-ray detector 1 will now be described with reference to FIG. 3. Compared to the first structure example of the X-ray detector 1 shown in FIG. 1, the scintillator layer 31 of the third structure example of the X-ray detector 1 does not include the columnar crystals 32; but the other configurations are similar.

The fourth structure example of the X-ray detector 1 will now be described with reference to FIG. 4. Compared to the second structure example of the X-ray detector 1 shown in FIG. 2, the scintillator layer 31 of the fourth structure example of the X-ray detector 1 does not include the columnar crystals 32; but the other configurations are similar.

In the X-ray detector 1 having the structures shown in FIG. 1 to FIG. 4, the scintillator layer 31 is a fluorescer of CsI containing Tl as an activator; the CsI is a halide; and the scintillator layer 31 has the following features (1), (2), (3), and (4).

(1): The concentration of the activator inside the fluorescer is 1.6 mass %±0.4 mass %; and the concentration of the activator inside the fluorescer in the in-plane direction of the scintillator layer 31 has the relationship of central portion>peripheral portion, where a central portion 31a (the inner region of the circular imaginary line illustrated by the double dot-dash line in FIG. 6) is the central region of the formation region of the scintillator layer 31, and a peripheral portion 31b (the outer region of the circular imaginary line illustrated by the double dot-dash line in FIG. 6) is the outer circumferential region of the formation region of the scintillator layer 31.

(2): The central portion 31a of the scintillator layer 31 has a concentric circular configuration or a square configuration having the center of the formation region of the scintillator layer 31 as a reference and occupies 50% or more of the formation region of scintillator layer 31.

(3): The uniformity of the scintillator layer 31 inside each region of the central portion 31a and the peripheral portion 31b of the scintillator layer 31 is maintained by setting the concentration distribution of the activator to be ±15% or less inside the fluorescer in the in-plane direction and the film thickness direction of the scintillator layer 31, and by setting the concentration distribution of the activator to be ±15% or less inside the fluorescer in the in-plane direction and the film thickness direction of the scintillator layer 31 in a region having a unit film thickness of 200 nm or less.

(4): The scintillator layer 31 is formed by vacuum vapor deposition using at least the two evaporation sources of CsI and TlI and favorably has the structure of the columnar crystals 32 having the rectangular configurations.

Figure 7:
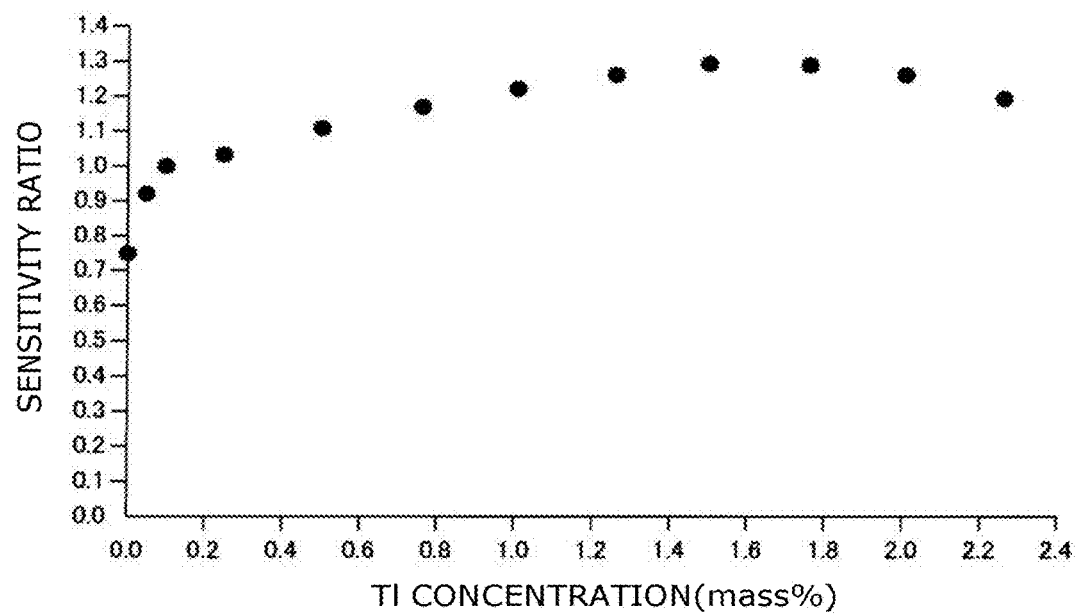
FIG. 7 shows the correlation between the sensitivity ratio and the Tl concentration in the scintillator layer.
Figure 8:
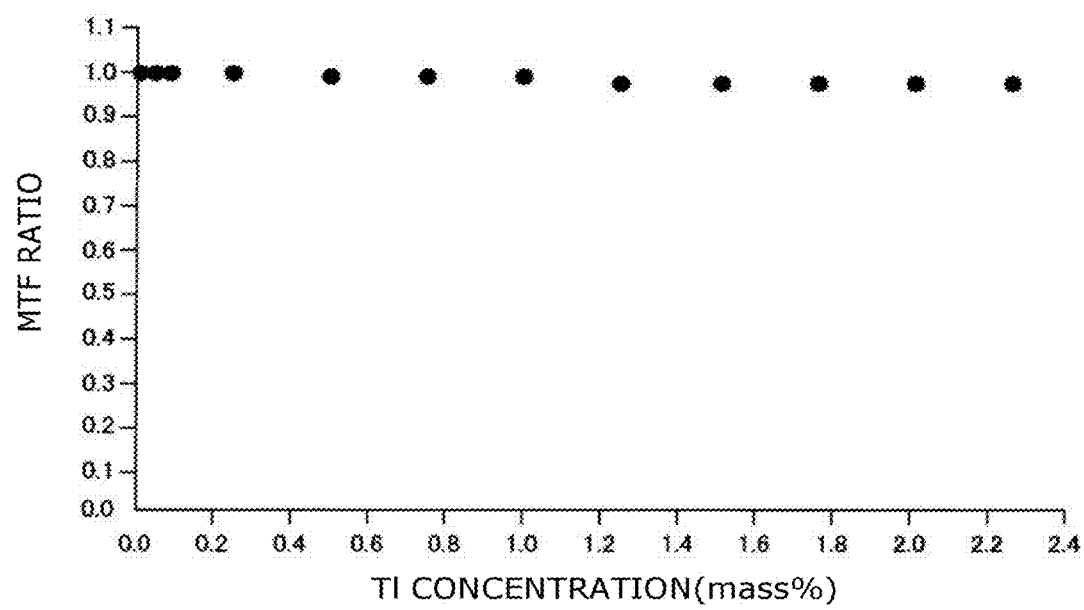
FIG. 8 shows the correlation between the MTF ratio which is the resolution and the Tl concentration in the scintillator layer.
Figure 9:
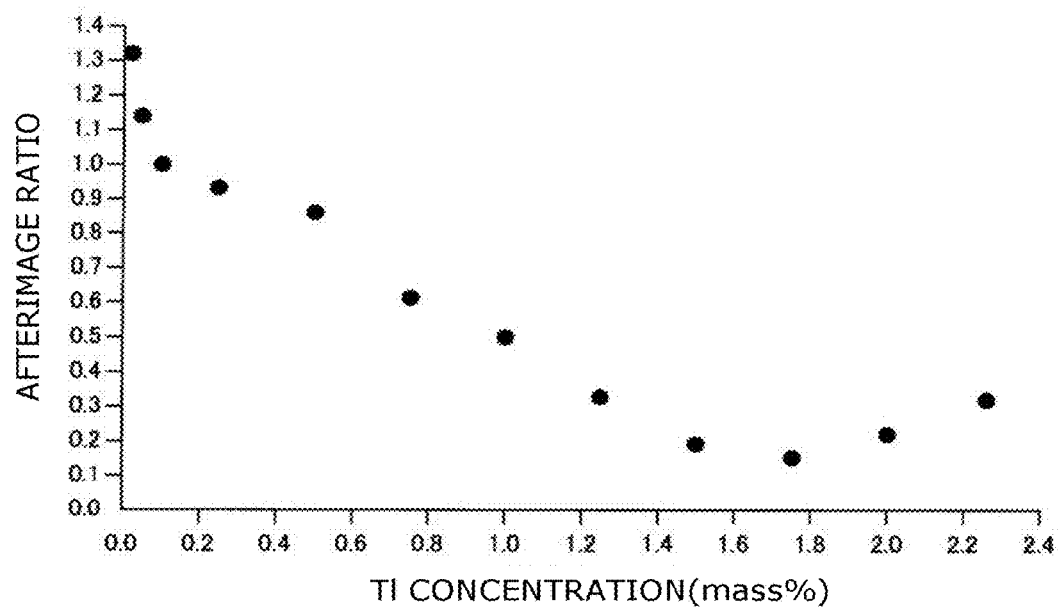
FIG. 9 shows the correlation between the afterimage ratio and the Tl concentration in the scintillator layer.
Figure 10:
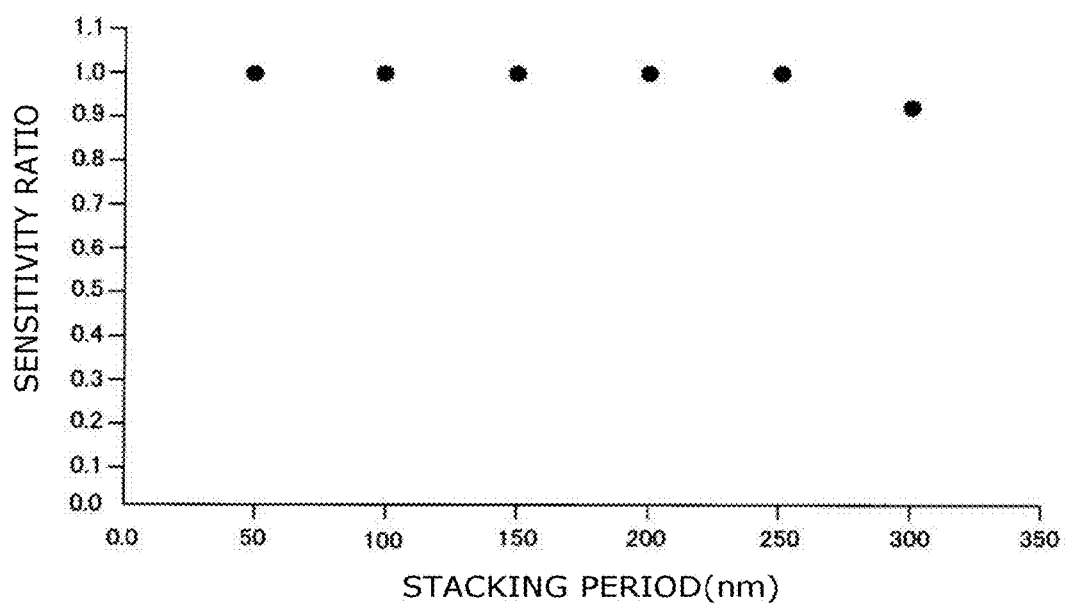
FIG. 10 shows the correlation between the sensitivity ratio and the stacking period of the scintillator layer.
Figure 11:
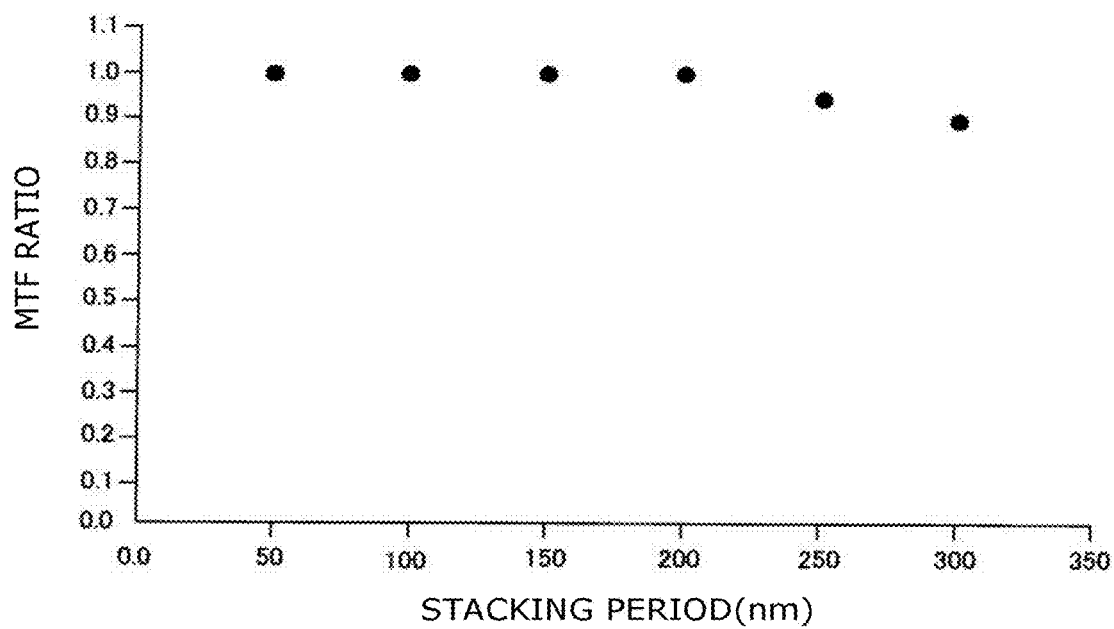
FIG. 11 shows the correlation between the MTF ratio and the stacking period of the scintillator layer.
Figure 12:
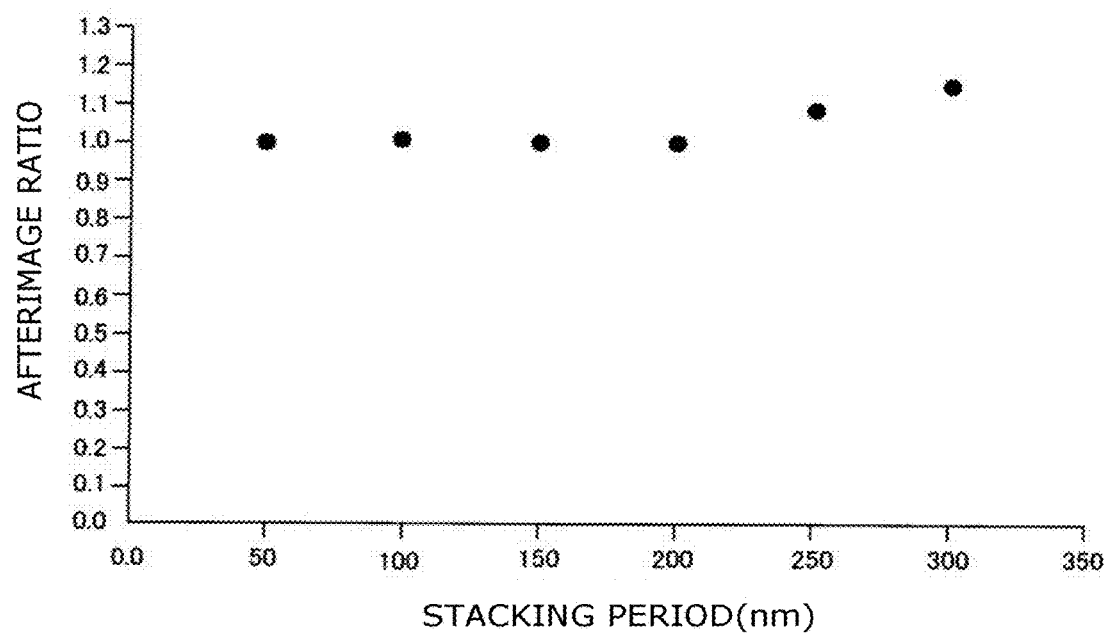
FIG. 12 shows the correlation between the afterimage ratio and the stacking period of the scintillator layer.

Here, the results of a test of the correlation between the characteristics and the Tl concentration in the scintillator layer 31 for the X-ray detector 1 of the first structure example shown in FIG. 1 having a film thickness of the scintillator layer 31 of 600 μm and an activator of Tl are shown in FIG. 7 to FIG. 9. The results of a test of the correlation between the characteristics and the stacking period (the formation period of the unit film thickness (the film thickness formed each rotation of the substrate)) of the scintillator layer 31 in the case where the Tl concentration in the scintillator layer 31 is set to be constant are shown in FIG. 10 to FIG. 12.

FIG. 7 shows the correlation between the sensitivity ratio and the Tl concentration in the scintillator layer 31. The test conditions include incident X-rays of 70 kV/0.0087 mGy. The sensitivity ratio is a ratio in which the sensitivity when the Tl concentration in the scintillator layer 31 is 0.1 mass % is used as a reference. The scintillator layer formation conditions (other than the Tl concentration in the scintillator layer 31) are the same for each of the test samples. As shown in FIG. 7, the sensitivity is improved most when the Tl concentration in the scintillator layer 31 is at the vicinity of 1.4 mass % to 1.8 mass %.

FIG. 8 shows the correlation between the MTF ratio which is the resolution and the Tl concentration in the scintillator layer 31. The test conditions include incident X-rays of 70 kV/0.0087 mGy. The MTF ratio is a ratio in which the MTF (at 2 Lp/mm) when the Tl concentration in the scintillator layer 31 is 0.1 mass % is used as a reference. The scintillator layer formation conditions (other than the Tl concentration in the scintillator layer 31) are the same for each of the test samples. As shown in FIG. 8, the Tl concentration in the scintillator layer 31 is substantially constant until the vicinity of 2.0 mass %.

FIG. 9 shows the correlation between the afterimage ratio and the Tl concentration in the scintillator layer 31. The test conditions include: a ray amount difference of the incident X-rays of the X-ray images of the (n−1)th time and the nth time of (n−1) >n; incident X-rays of 70 kV/0.87 mGy, a subject of a lead plate (having a plate thickness of 3 mm), and an X-ray imaging interval of 60 sec for the X-ray image of the (n−1)th time; and incident X-rays of 70 kV/0.0087 mGy, no subject, and an X-ray imaging interval of 60 sec for the X-ray image of the nth time. The afterimage ratio is a ratio in which the afterimage when the Tl concentration in the scintillator layer 31 is 0.1 mass % is used as a reference. The scintillator layer formation conditions (other than the Tl concentration in the scintillator layer 31) are the same for each of the test samples. As shown in FIG. 9, the afterimage has a minimum level when the Tl concentration in the scintillator layer 31 is at the vicinity of 1.6 mass %. The afterimage is not confirmed in the region where the afterimage ratio is 0.5 (favorably 0.4) or less and where the Tl concentration is 1.6 mass %±0.4 mass %.

FIG. 10 shows the correlation between the sensitivity ratio and the stacking period of the scintillator layer 31. The test conditions include incident X-rays of 70 kV/0.0087 mGy and a Tl concentration in the scintillator layer 31 of 0.1 mass %. The sensitivity ratio is a ratio in which the sensitivity when the stacking period of the scintillator layer 31 is 200 nm is used as a reference. The scintillator layer formation conditions (other than the Tl concentration in the scintillator layer 31) are the same for each of the test samples.

FIG. 11 shows the correlation between the MTF ratio and the stacking period of the scintillator layer 31. The test conditions include incident X-rays of 70 kV/0.0087 mGy and a Tl concentration in the scintillator layer 31 of 0.1 mass %. The MTF ratio is a ratio in which the MTF (at 2 Lp/mm) when the stacking period of the scintillator layer 31 is 200 nm is used as a reference. The scintillator layer formation conditions (other than the Tl concentration in the scintillator layer 31) are the same for each of the test samples.

FIG. 12 shows the correlation between the afterimage ratio and the stacking period of the scintillator layer 31. The test conditions include: a ray amount difference of the incident X-rays of the X-ray images of the (n−1)th time and the nth time of (n−1)>n; incident X-rays of 70 kV/0.87 mGy, a subject of a lead plate (having a plate thickness of 3 mm), and an X-ray imaging interval of 60 sec for the X-ray image of the (n−1)th time; and incident X-rays of 70 kV/0.0087 mGy, no subject, and an X-ray imaging interval of 60 sec for the X-ray image of the nth time. The Tl concentration in the scintillator layer 31 is set to 0.1 mass %. The afterimage ratio is a ratio in which the afterimage when the stacking period of the scintillator layer 31 is 200 nm is used as a reference. The scintillator layer formation conditions (other than the Tl concentration in the scintillator layer 31) are the same for each of the test samples.

As shown in FIG. 10 to FIG. 12, there is a tendency for each of the characteristics to degrade in the region where the stacking period of the scintillator layer 31 is 200 mm or more.

Because the refractive index of CsI which is the main material of the scintillator layer 31 is 1.8 while the peak wavelength of the light emission wavelength of the scintillator layer 31 is at the vicinity of 550 nm, it can be considered that 2l=550 nm/1.8=306 nm from the relationship between the refractive index and the wavelength, where 2l is the peak wavelength of the light emission wavelength propagating through the scintillator layer 31. Accordingly, it is considered that the results of FIG. 10 to FIG. 12 are caused by the high likelihood of being affected by the degradation of the optical characteristics (scattering, attenuation, etc.) due to the fluctuation of the crystallinity of the scintillator layer 31, the fluctuation of the Tl concentration in the scintillator layer 31, etc., in the case where the stacking period of the scintillator layer 31 is larger than 2l.

As shown in FIG. 9, the afterimage has a minimum level when the concentration of the activator inside the fluorescer which is the scintillator layer 31 is at the vicinity of 1.6 mass %;

and the afterimage is not confirmed in the region of 1.6 mass %±0.4 mass % where the afterimage ratio is 0.5 (favorably 0.4) or less. As shown in FIG. 7 and FIG. 8, because the characteristics of the sensitivity and the MTF are good in the region of 1.6 mass %±0.4 mass %, the region of 1.6 mass %±0.4 mass % is favorable for the concentration of the activator.

As shown in FIG. 7 to FIG. 9, because each of the characteristics is near the stable state in the region where the Tl concentration in the scintillator layer 31 is 1.6 mass %±0.4 mass %, the fluctuation of each of the characteristics is small even when the Tl concentration in the scintillator layer 31 fluctuates (about ±15%).

From the correlation diagrams shown in FIG. 7 to FIG. 9, the characteristic (particularly, the afterimage characteristic) improvement effects of the scintillator layer 31 are largest in the region where the Tl concentration in the scintillator layer 31 is 1.6 mass %±0.4 mass %; and there is an optimal value at the vicinity of 1.6 mass %. In the case where the scintillator layer 31 is a fluorescer of CsI containing Tl as an activator and the CsI is a halide, the following characteristics (a), (b), and (c) are obtained.

(a): Although CsI has a high hygroscopicity and deliquesces by reacting with the moisture inside ambient air, TlI is not hygroscopic; therefore, the moisture resistance of the scintillator layer 31 improves as the Tl concentration in the scintillator layer 31 increases.

(b): Because the atomic weight of Tl is larger than that of Cs, the DQE (the X-ray absorptance) of the scintillator layer 31 improves as the Tl concentration in the scintillator layer 31 increases; therefore, the quantum noise of the X-ray image decreases; and it is possible to obtain an X-ray image having a high SN.

(c): Because the atomic weight of Tl is larger than that of Cs, the DQE (the X-ray absorptance) of the scintillator layer 31 improves as the Tl concentration in the scintillator layer 31 increases; therefore, damage to the photoelectric conversion element 8, the ICs on the photoelectric conversion substrate 2, etc., due to the transmitted X-rays is reduced.

Thus, the effects of (a) to (c) recited above are obtained more as the Tl concentration in the scintillator layer 31 increases.

In a diagnosis or the like using an X-ray image, normally, there are many cases where the diagnosis is performed in the state in which the subject is disposed at the central portion of the X-ray image. Therefore, it is possible to improve the overall characteristics including the afterimage characteristics of the scintillator layer 31 and increase of the reliability of the X-ray detector 1 if the Tl concentration in the fluorescer is set to 1.6 mass %±0.4 mass % and the Tl concentration in the fluorescer in the in-plane direction of the scintillator layer 31 has the relationship of central portion>peripheral portion, where the central portion 31a is the central region of the formation region of the scintillator layer 31, and the peripheral portion 31b is the outer circumferential region of the formation region of the scintillator layer 31 as in the feature of (1) recited above.

The X-ray detector 1 suited to the diagnosis or the like using the X-ray image can be provided by setting the central portion 31a of the scintillator layer 31 to occupy 50% or more of the formation region of the scintillator layer 31 as in the feature of (2) recited above. Even in the region where the concentration of the activator inside the fluorescer is 1.6 mass %±0.4 mass %, each of the characteristics easily fluctuates greatly if there is a large bias in the concentration distribution of the activator inside the fluorescer in the in-plane direction and the film thickness direction of the scintillator layer 31. Therefore, it is favorable for the concentration distribution of the activator to be within ±15% inside the fluorescer in the in-plane direction and the film thickness direction of the scintillator layer 31. If the concentration distribution of the activator inside the fluorescer is within the fluctuation range of about ±15%, the fluctuation of each of the characteristics is small and the effect is small.

Each of the characteristics easily fluctuates greatly if there is a large bias in the concentration distribution of the activator inside the fluorescer in the in-plane direction and the film thickness direction of the scintillator layer 31 in at least of the region of the scintillator layer 31 having the unit film thickness of 200 nm or less. Therefore, even in the region having the unit film thickness of 200 mm or less, it is favorable for the concentration distribution of the activator to be within ±15% inside the fluorescer in the in-plane direction and the film thickness direction of the scintillator layer 31.

Accordingly, it is favorable for the concentration distribution of the activator to be ±15% or less inside the fluorescer in the in-plane direction and the film thickness direction of the scintillator layer 31, and for the concentration distribution of the activator to be within ±15% inside the fluorescer in the in-plane direction and the film thickness direction of the scintillator layer 31 in a region having a unit film thickness of 200 nm or less as in the feature of (3) recited above.

Figure 13:
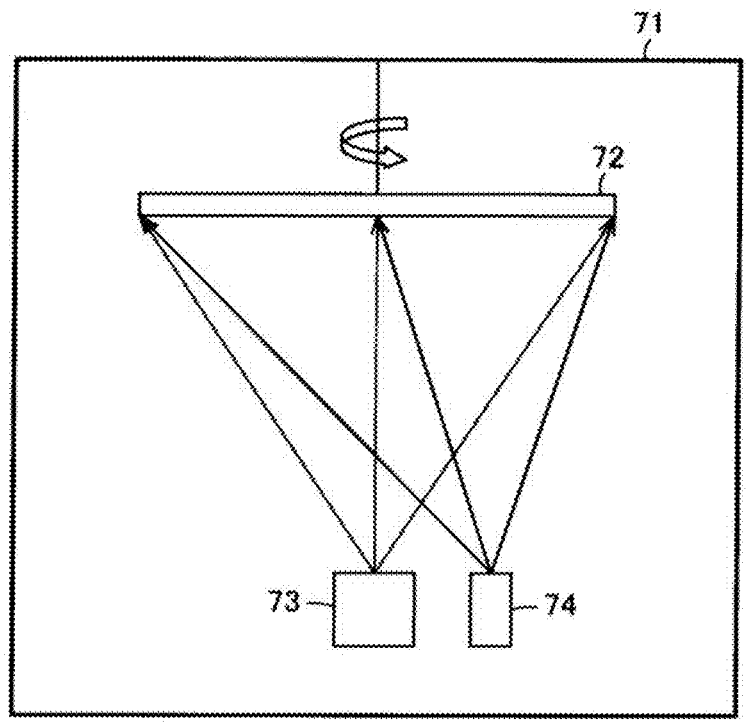
FIG. 13 is a schematic view of a general method for forming the scintillator layer.
Figure 14:
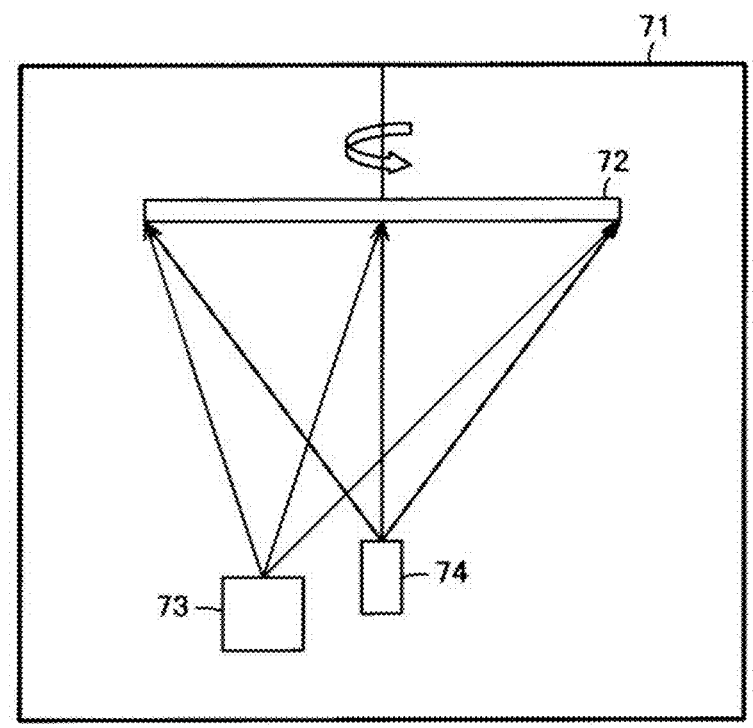
FIG. 14 is a schematic view showing an example of formation method that changes the concentration of the activator inside the fluorescer between the central portion and the peripheral portion of the scintillator layer.
Figures 15, 16:
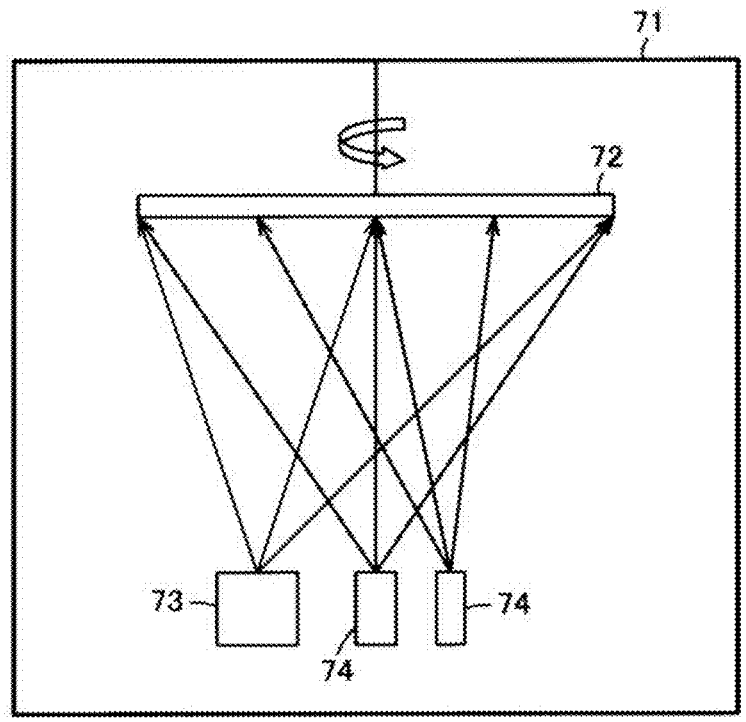
FIG. 15 is a schematic view showing another example of formation method that changes the concentration of the activator inside the fluorescer between the central portion and the peripheral portion of the scintillator layer.
FIG. 16 is a graph of samples A, B, C, D, and E of the radiation detector according to the embodiment which the concentration of the activator inside fluorescer between the central portion and the peripheral portion of the scintillator layer are changed.

Here, FIG. 13 is a schematic view of a general method for forming the scintillator layer 31. FIG. 14 and FIG. 15 are schematic views of formation methods that change the concentration of the activator inside the fluorescer between the central portion 31a and the peripheral portion 31b of the scintillator layer 31.

In FIG. 13, the film of the scintillator layer 31 is formed by stacking by disposing a substrate 72 (corresponding to the photoelectric conversion substrate 2 or the support substrate 63) inside a vacuum chamber 71 and by performing vacuum vapor deposition that vapor-deposits, onto the stacked surface of the substrate 72, evaporated particles from an evaporation source 73 of CsI and evaporated particles from an evaporation source 74 of TlI mounted inside the vacuum chamber 71 while rotating the substrate 72.

At this time, the Tl concentration distribution in the in-plane direction and the film thickness direction per stacking period of the scintillator layer 31 can be controlled arbitrarily by controlling the rotation period of the substrate 72 and the evaporation of CsI and TlI. Therefore, when forming the scintillator layer 31, if the uniformity of the Tl concentration distribution in the in-plane direction and the film thickness direction per stacking period of the scintillator layer 31 is ensured, the uniformity of the Tl concentration distribution in the in-plane direction and the film thickness direction of the entire scintillator layer 31 also is ensured.

It is possible to change the Tl concentration distribution in the in-plane direction of the scintillator layer 31 by disposing one evaporation source 74 of TlI to oppose the substrate 72 on the central axis (on the center of rotation) of the substrate 72 as shown in FIG. 14, or by using two evaporation sources 74 of TlI and disposing one of the two evaporation sources 74 to oppose the substrate 72 on the central axis (on the center of rotation) of the substrate 72 as shown in FIG. 15. By the formation method, it is possible to form the concentration of the activator inside the fluorescer in the in-plane direction of the scintillator layer 31 to have the relationship of central portion>peripheral portion, where the central portion 31a is the central region of the formation region of the scintillator layer 31, and the peripheral portion 31b is the outer circumferential region of the formation region of the scintillator layer 31.

Thereby, if the scintillator layer 31 made of a fluorescer of CsI containing Tl as an activator in which the CsI is a halide is provided with the features of (1) to (4) recited above by considering the characteristics of (a) to (c) recited above, it is possible to improve the overall characteristics including the afterimage characteristics of the scintillator layer 31 and increase the reliability of the X-ray detector 1.

An example of the X-ray detector 1 of the first structure example shown in FIG. 1 will now be described. In the example, the film thickness of the scintillator layer 31 was 600 μm; the stacking period of the scintillator layer 31 was 150 nm; Tl was used as the activator; and the formation region of the scintillator layer 31 was 432 mm by 432 mm. The central portion 31a of the scintillator layer 31 was set to be a concentric circular region occupying 50% with the center of the formation region of the scintillator layer 31 as a reference; the peripheral portion 31b of the scintillator layer 31 was set to be the region other than the central portion 31a of the formation region of the scintillator layer 31; and the concentration distribution of the activator was set to ±15% inside the fluorescer in the in-plane direction and the film thickness direction of the scintillator layer 31 in each region of the central portion 31a and the peripheral portion 31b of the scintillator layer 31. Using such conditions, sample A, B, C, D, and E of the X-ray detector 1 were made in which the concentration of the activator in each region of the central portion 31a and the peripheral portion 31b of the scintillator layer 31 was changed as shown in FIG. 16.

The X-ray images (the nth time) for sample A, B, C, D, and E of the X-ray detector 1 in which the subject is imaged using the prescribed imaging conditions and the image that is imaged is processed using the prescribed image processing conditions are shown in FIGS. 17A, 17B, 17C, 17D, and 17E. The results of the characteristics at this time are shown in the table of FIG. 18. In FIG. 18, the sensitivity ratio, the MTF ratio, and the afterimage ratio are values for which a Tl concentration in the scintillator layer 31 of 0.1 mass % is used as a reference.

The imaging conditions are set so that the ray amount difference of the incident X-rays of the X-ray images of the (n−1)th time and the nth time is (n−1)>n; incident X-rays of 70 kV/0.87 mGy, a subject of a lead plate (having a plate thickness of 3 mm), and an X-ray imaging interval of 60 sec are used for the X-ray image of the (n−1)th time; and incident X-rays of 70 kV/0.0087 mGy, no subject, and an X-ray imaging interval of 60 sec are used for the X-ray image of the nth time.

The image processing conditions are set so that the flat field correction is ON and the windowing is ON (the histogram average value of the image is ±10%).

As shown in FIGS. 17A and 17B, afterimages are confirmed in the area surrounded with the quadrilateral broken line in FIGS. 17A and 17B for sample A in which the concentration of the activator inside the fluorescer in each region of the central portion 31a and the peripheral portion 31b of the scintillator layer 31 is 0.1 mass % and for sample B in which the concentration is 1.0 mass %. On the other hand, as shown in FIGS. 17C, 17D, and 17E, afterimages are not confirmed in the area surrounded with the quadrilateral broken line in FIGS. 17C, 17D, and 17E for sample C in which the concentration of the activator inside the fluorescer in each region of the central portion 31a and the peripheral portion 31b of the scintillator layer 31 is 1.2 mass %, for sample D in which the concentration of the activator inside the fluorescer in each region of the central portion 31a and the peripheral portion 31b of the scintillator layer 31 is 1.6 mass %, and for sample E in which the concentration of the activator inside the fluorescer at the central portion 31a of the scintillator layer 31 is 1.7 mass % and the concentration of the activator inside the fluorescer at the peripheral portion 31b of the scintillator layer 31 is 1.5 mass %. In FIGS. 17A, 17B, 17C, 17D, and 17E, the inner side of the circular imaginary line illustrated by the double dot-dash line corresponds to the imaging region at the central portion 31a of the scintillator layer 31; and the outer side of the circular imaginary line corresponds to the imaging region at the peripheral portion 31b of the scintillator layer 31.

Accordingly, by providing the scintillator layer 31 with the features of (1) to (4) recited above specified in the embodiment, it is possible to increase the performance and reliability of the X-ray detector 1 because the afterimage characteristics can be improved with the sensitivity and the MTF in good states.

An embodiment in which the scintillator layer according to the invention is used in a scintillator panel will now be described.

FIG. 19 to FIG. 22 show the first to fourth structure examples and describe the basic configuration of a scintillator panel 90.

Figure 19:
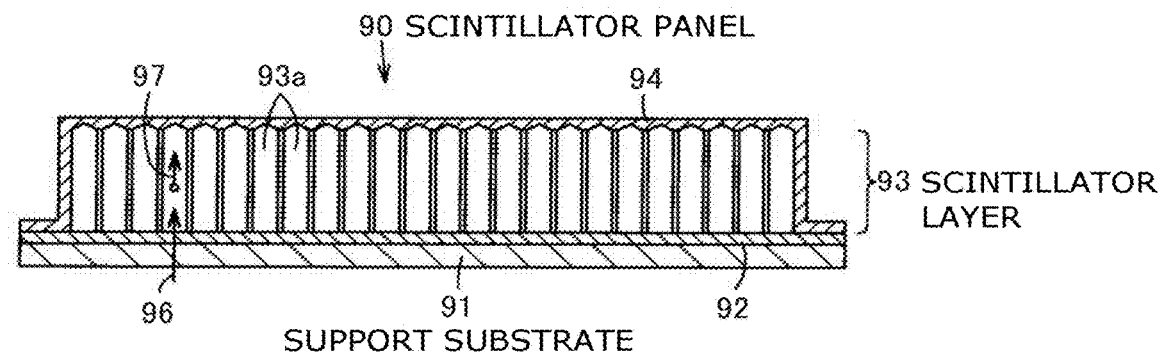
FIG. 19 is a cross-sectional view showing a first structure example of the scintillator panel according to the embodiment.

First, the first structure example of the scintillator panel 90 will be described with reference to FIG. 19. The scintillator panel 90 includes a support substrate 91 that transmits X-rays as radiation. A reflective layer 92 that reflects light is formed on the support substrate 91; a scintillator layer 93 that converts radiation into visible light is formed on the reflective layer 92; and a protective layer 94 that seals the scintillator layer 93 is formed to be stacked on the scintillator layer 93. The support substrate 91 includes a substance that includes an element lighter than a transition metal element as a major component and has a high transmittance of X-rays.

The reflective layer 92 includes a metal material having a high reflectance such as Al, Ni, Cu, Pd, Ag, etc., and increases the light utilization efficiency by reflecting the light produced by the scintillator layer 93 in the opposite direction of the support substrate 91.

The scintillator layer 93 is formed by depositing, in columnar configurations on the support substrate 91, a fluorescer such as a halogen compound of cesium iodide (CsI) or the like, an oxide compound such as gadolinium oxide sulfur (GOS) or the like, etc., which are high-luminance fluorescent substances by, for example, a vapor deposition such as vacuum vapor deposition, sputtering, CVD, etc. Then, the scintillator layer 93 is formed to have a columnar crystal structure in which columnar crystals 93a having multiple rectangular configurations are formed in the planar direction of the support substrate 91.

Then, in the scintillator panel 90 thus configured, X-rays 96 that are incident on the scintillator layer 93 as the radiation from the support substrate 91 side are converted into visible light 97 by the columnar crystals 93a of the scintillator layer 93; and the visible light 97 is emitted from the surface of the scintillator layer 93 (the surface of the protective layer 94) on the side opposite to the support substrate 91.

Figure 20:
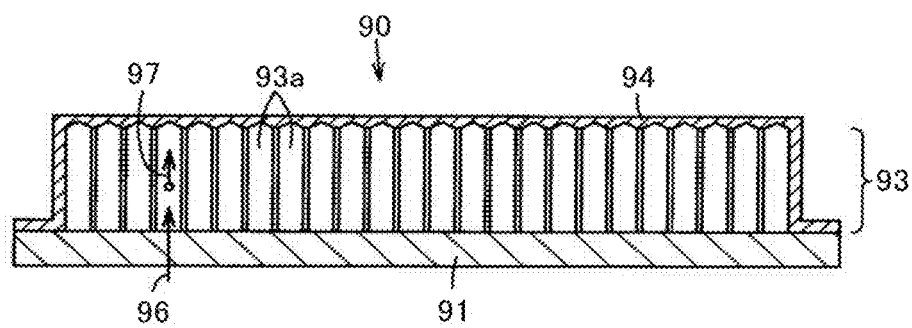
FIG. 20 is a cross-sectional view showing a second structure example of the scintillator panel according to the embodiment.

FIG. 20 shows the second structure example of the scintillator panel 90. Compared to the first structure example of the scintillator panel 90 shown in FIG. 1, the second structure example of the scintillator panel 90 does not include the reflective layer 92; but the other configurations are similar.

Figure 21:
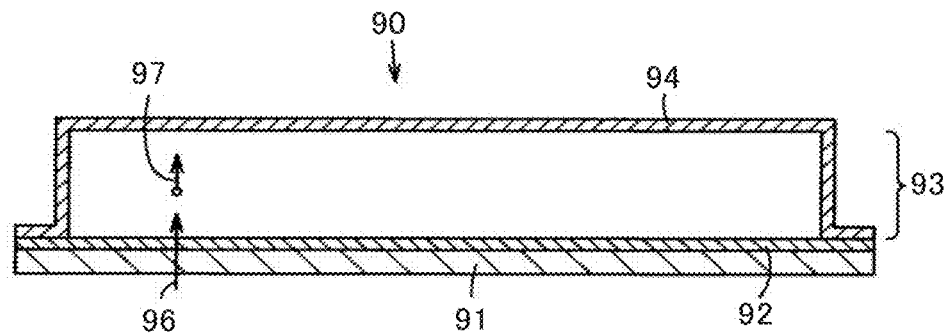
FIG. 21 is a cross-sectional view showing a third structure example of the scintillator panel according to the embodiment.

FIG. 21 shows the third structure example of the scintillator panel 90. Compared to the first structure example of the scintillator panel 90 shown in FIG. 19, the scintillator layer 93 does not include the columnar crystals 93*a* in the third structure example of the scintillator panel 90; but the other configurations are similar.

Figure 22:
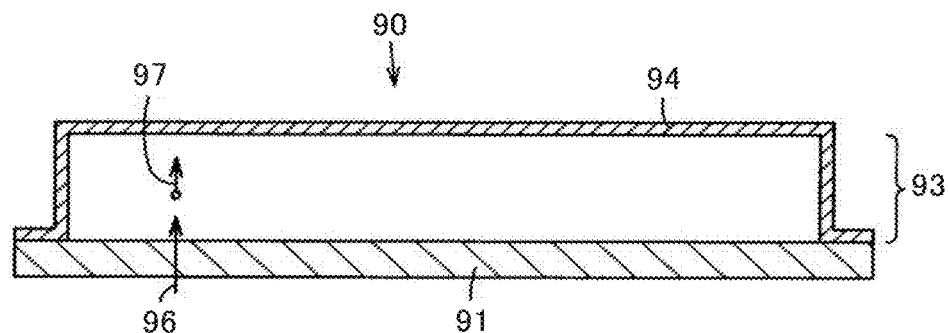
FIG. 22 is a cross-sectional view showing a fourth structure example of the scintillator panel according to the embodiment.

FIG. 22 shows the fourth structure example of the scintillator panel 90. Compared to the second structure example of the scintillator panel 90 shown in FIG. 20, the scintillator layer 93 does not include the columnar crystals 93*a* in the fourth structure example of the scintillator panel 90; but the other configurations are similar.

Figure 23:
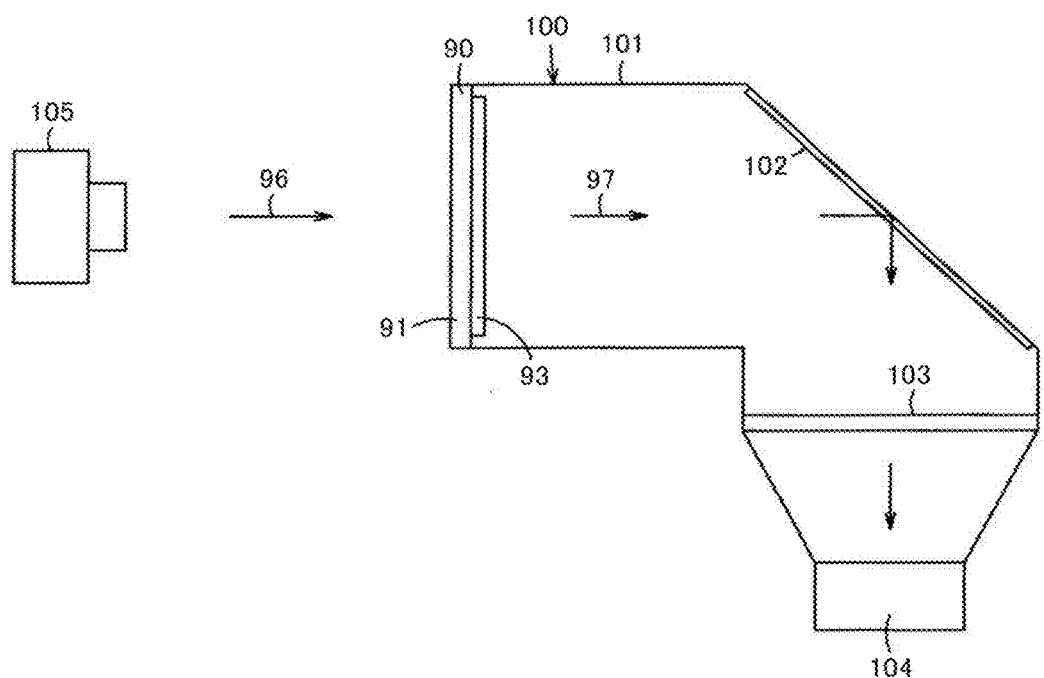
FIG. 23 is a cross-sectional view showing a imaging device using the scintillator panel according to the embodiment.
Figure 24:
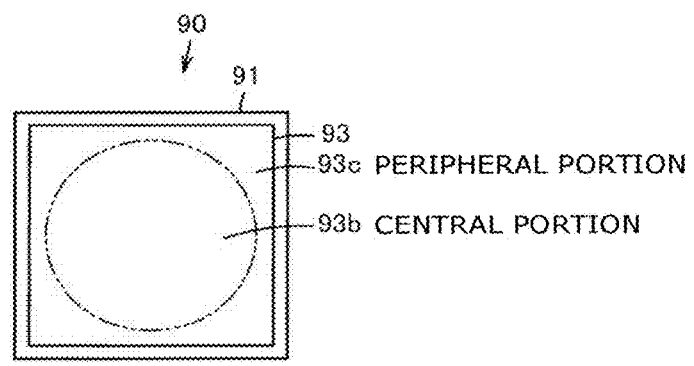
FIG. 24 is a front view showing the scintillator layer side of the scintillator panel according to the embodiment.

FIG. 23 shows an imaging device 100 which is, for example, a CCD-DR type and includes the scintillator panel 90. The imaging device 100 includes a housing 101; the scintillator panel 90 is mounted at one end of the housing 101; an optical lens 103 and a reflection plate 102 having a mirror surface are mounted in the interior of the housing 101; and a light receiving element 104 such as, for example, a CCD or the like is mounted at the other end of the housing 101. The X-rays 96 are radiated from an X-ray generation source (an X-ray tube) 105 and are incident on the scintillator panel 90; and the visible light 97 converted by the scintillator layer 93 is emitted from the surface of the scintillator layer 93. The X-ray image is projected onto the surface of the scintillator layer 93; the X-ray image is reflected by the reflection plate 102, condensed by the optical lens 103, and irradiated on the light receiving element 104; and the X-ray image is converted into an electrical signal by the light receiving element 104 and output.

In the scintillator panel 90 having the structure shown in FIG. 19 to FIG. 22, the scintillator layer 93 is a fluorescer of CsI containing Tl as an activator in which the CsI is a halide, and has the following features (1), (2), (3), and (4) similarly to the scintillator layer 31.

(1): The concentration of the activator inside the fluorescer is 1.6 mass %±0.4 mass % and the concentration of the activator inside the fluorescer in the in-plane direction of the scintillator layer 93 has the relationship of central portion>peripheral portion, where a central portion 93*b* (the inner region of the circular imaginary line illustrated by the double dot-dash line in FIG. 24) is the central region of the formation region of the scintillator layer 93, and a peripheral portion 93*c* (the outer region of the circular imaginary line illustrated by the double dot-dash line in FIG. 24) is the outer circumferential region of the formation region of the scintillator layer 93.

(2): The central portion 93*b* of the scintillator layer 93 has a concentric circular configuration or a square configuration having the center of the formation region of the scintillator layer 93 as a reference and occupies 50% or more of the formation region of the scintillator layer 93.

(3): The uniformity of the scintillator layer 93 inside each region of the central portion 93*b* and the peripheral portion 93*c* of the scintillator layer 93 is maintained by setting the concentration distribution of the activator to be ±15% or less inside the fluorescer in the in-plane direction and the film thickness direction of the scintillator layer 93 in a region having a unit film thickness of 200 nm or less, and by setting the concentration distribution of the activator to be ±15% or less inside the fluorescer in the in-plane direction and the film thickness direction of the scintillator layer 93.

(4): The scintillator layer 93 is formed by vacuum vapor deposition using the two evaporation sources of CsI and TlI and favorably has the structure of the columnar crystals 93*a* having the rectangular configurations.

As described in the description in reference to FIG. 7 to FIG. 12, by using the scintillator layer 93 having the features of (1) to (4) recited above in the scintillator panel 90, it is possible to improve the afterimage characteristics with the sensitivity of the scintillator panel 90 in a good state.

It is also similar in that the effects of (a) to (c) described above are obtained more as the Tl concentration in the scintillator layer 93 increases.

In a diagnosis or the like using an X-ray image, normally, there are many cases where the diagnosis is performed in the state in which the subject is disposed at the central portion of the X-ray image. Therefore, it is possible to improve the overall characteristics including the afterimage characteristics of the scintillator layer 93 and increase the reliability of the scintillator panel 90 if the Tl concentration in the fluorescer is set to 1.6 mass %±0.4 mass % and the Tl concentration in the fluorescer in the in-plane direction of the scintillator layer 93 has the relationship of central portion >peripheral portion, where the central portion 93*b* is the central region of the formation region of the scintillator layer 93 and the peripheral portion 93*c* is the outer circumferential region of the formation region of the scintillator layer 93 as in the feature of (1) recited above.

The scintillator panel 90 suited to the diagnosis or the like using the X-ray image can be provided by setting the central portion 93*b* of the scintillator layer 93 to occupy 50% or more of the formation region of the scintillator layer 93 as in the feature of (2) recited above.

Even in the region where the concentration of the activator inside the fluorescer is 1.6 mass %±0.4 mass %, each of the characteristics easily fluctuates greatly if there is a large bias in the concentration distribution of the activator inside the fluorescer in the in-plane direction and the film thickness direction of the scintillator layer 93; therefore, it is favorable for the concentration distribution of the activator to be within ±15 % inside the fluorescer in the in-plane direction and the film thickness direction of the scintillator layer 93. If the concentration distribution of the activator inside the fluorescer is within the fluctuation range of about ±15 %, the fluctuation of each of the characteristics is small and the effect is small. Each of the characteristics easily fluctuates greatly if there is a large bias in the concentration distribution of the activator inside the fluorescer in the in-plane direction and the film thickness direction of the scintillator layer 93 in at least the region of the scintillator layer 93 having the unit film thickness of 200 nm or less; therefore, even in a region having a unit film thickness of 200 nm or less, it is favorable for the concentration distribution of the activator to be within ±15 % inside the fluorescer in the in-plane direction and the film thickness direction of the scintillator layer 93.

Accordingly, it is favorable for the concentration distribution of the activator to be ±15% or less inside the fluorescer in the in-plane direction and the film thickness direction of the scintillator layer 93, and for the concentration distribution of the activator to be within ±15% inside the fluorescer in the in-plane direction and the film thickness direction of the scintillator layer 93 in a region having a unit film thickness of 200 nm or less as in the feature of (3) recited above.

Thus, by providing the scintillator layer 93 with the features of (1) to (4) recited above specified in the embodiment, it is possible to increase the performance and reliability of the scintillator panel 90 because the afterimage characteristics can be improved with the sensitivity and the MTF in good states.

It is possible to use a method similar to the method for forming the scintillator layer 31 described using FIG. 13 to FIG. 15 as the method for forming the scintillator layer 93.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A radiation detector, comprising:
   a photoelectric conversion substrate converting light into an electrical signal; and
   a scintillator layer contacting the photoelectric conversion substrate and converting radiation incident from the outside into light,
   the scintillator layer being a fluorescer of CsI containing Tl as an activator, the CsI being a halide, a concentration of the activator inside the fluorescer being 1.6 mass %±0.4 mass %, the concentration of the activator inside the fluorescer in an in-plane direction of the scintillator layer having the relationship of central portion>peripheral portion, where central portion is a central region of a formation region of the scintillator layer, and peripheral portion is an outer circumferential region of the formation region of the scintillator layer.

2. The detector according to claim 1, wherein the central portion of the scintillator layer occupies 50% or more of the formation region of the scintillator layer.

3. The detector according to claim 1, wherein in the scintillator layer inside each region of the central portion and the peripheral portion of the scintillator layer, a concentration distribution of the activator is ±15% or less inside the fluorescer in a film thickness direction and the in-plane direction of the scintillator layer, and the concentration distribution of the activator is ±15% or less inside the fluorescer in the film thickness direction and the in-plane direction of the scintillator layer in a region having a unit film thickness of 200 nm or less.

4. The detector according to claim 1, wherein the scintillator layer has a columnar crystal structure.

5. A method for manufacturing a radiation detector,
   the radiation detector including a photoelectric conversion substrate and a scintillator layer, the photoelectric conversion substrate converting light into an electrical signal,
   the scintillator layer contacting the photoelectric conversion substrate and converting radiation incident from the outside into light,
   the scintillator layer being a fluorescer of CsI containing Tl as an activator, the CsI being a halide, the method comprising:
   forming the scintillator layer by vapor deposition using CsI and Tl as a material source to cause a concentration of the activator inside the fluorescer to be 1.6 mass %±0.4 mass % and cause the concentration of the activator inside the fluorescer in an in-plane direction of the scintillator layer to have the relationship of central portion >peripheral portion, where central portion is a central region of a formation region of the scintillator layer, and peripheral portion is an outer circumferential region of the formation region of the scintillator layer.

6. A scintillator panel, comprising:
   a support substrate transmitting radiation; and
   a scintillator layer contacting the support substrate and converting radiation incident from the outside into light, the scintillator layer being a fluorescer of CsI containing Tl as an activator, the CsI being a halide, a concentration of the activator inside the fluorescer being 1.6 mass %±0.4 mass %, the concentration of the activator inside the fluorescer in an in-plane direction of the scintillator layer having the relationship of central portion >peripheral portion, where central portion is a central region of a formation region of the scintillator layer, and peripheral portion is an outer circumferential region of the formation region of the scintillator layer.

7. The scintillator panel according to claim 6, wherein the central portion of the scintillator layer occupies 50% or more of the formation region of the scintillator layer.

8. The scintillator panel according to claim 6, wherein
   in the scintillator layer inside each region of the central portion and the peripheral portion of the scintillator layer, a concentration distribution of the activator is ±15% or less inside the fluorescer in a film thickness direction and the in-plane direction of the scintillator layer, and the concentration distribution of the activator is ±15% or less inside the fluorescer in the film thickness direction and the in-plane direction of the scintillator layer in a region having a unit film thickness of 200 nm or less.

9. The scintillator panel according to claim 6, wherein the scintillator layer has a columnar crystal structure.

10. The scintillator panel according to claim 6, wherein the support substrate includes a substance having an element lighter than a transition metal element as a major component.

11. A method for manufacturing a scintillator panel,
    the scintillator panel including a support substrate and a scintillator layer, the support substrate transmitting radiation, the scintillator layer contacting the support substrate and converting radiation incident from the outside into light,
    the scintillator layer being a fluorescer of CsI containing Tl as an activator, the CsI being a halide,
    the method comprising:
    forming a scintillator layer by vapor deposition using CsI and Tl as a material source to cause a concentration of the activator inside the fluorescer to be 1.6 mass %±0.4 mass % and cause the concentration of the activator inside the fluorescer in an in-plane direction of the scintillator layer to have the relationship of central portion>peripheral portion, where central portion is a central region of a formation region of the scintillator layer, and peripheral portion is an outer circumferential region of the formation region of the scintillator layer.

* * * * *